May 23, 1933.  E. WILDHABER  1,910,731
PHOTOGRAPHIC CAMERA
Filed Nov. 19, 1928   3 Sheets-Sheet 1
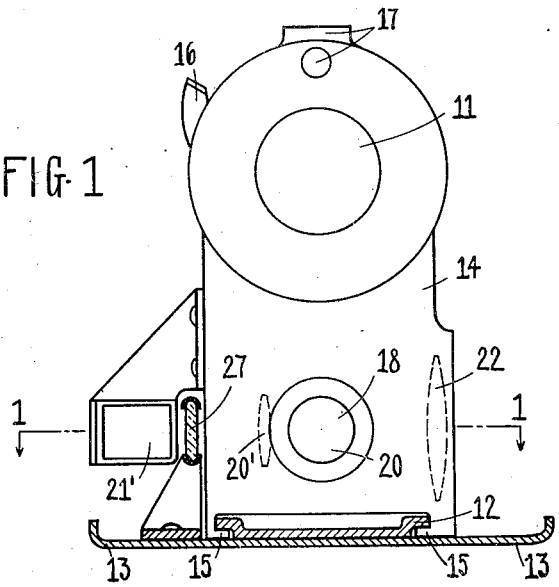
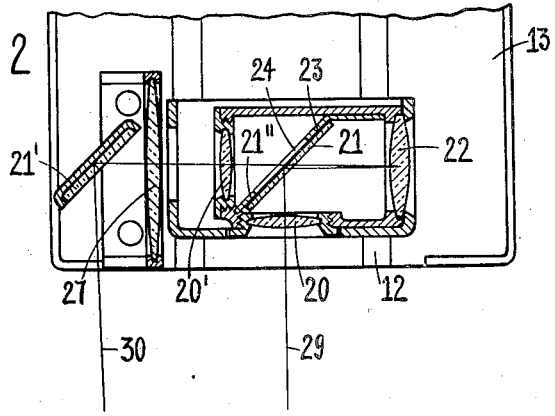
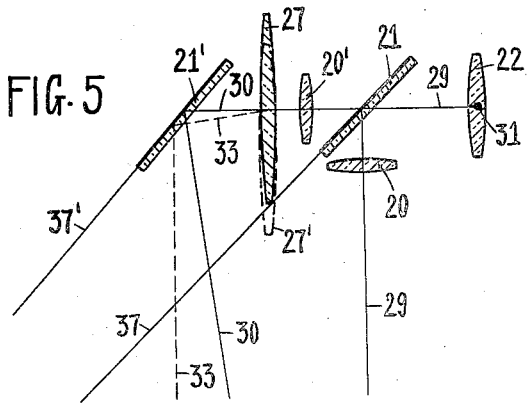
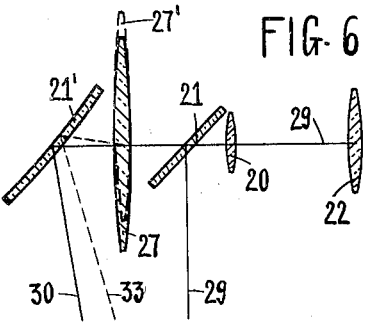
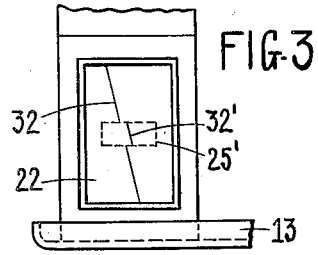
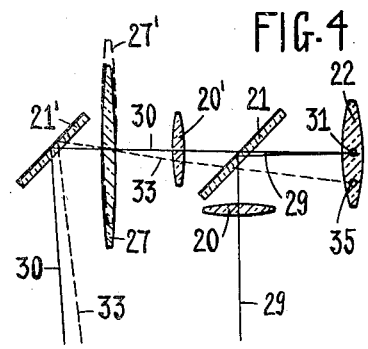
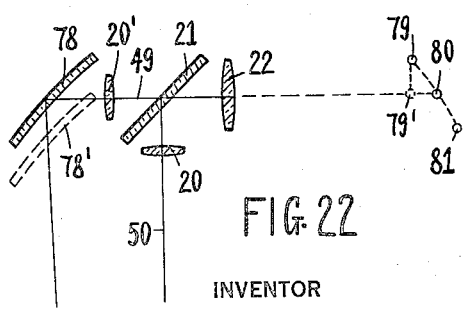
INVENTOR
Ernest Wildhaber

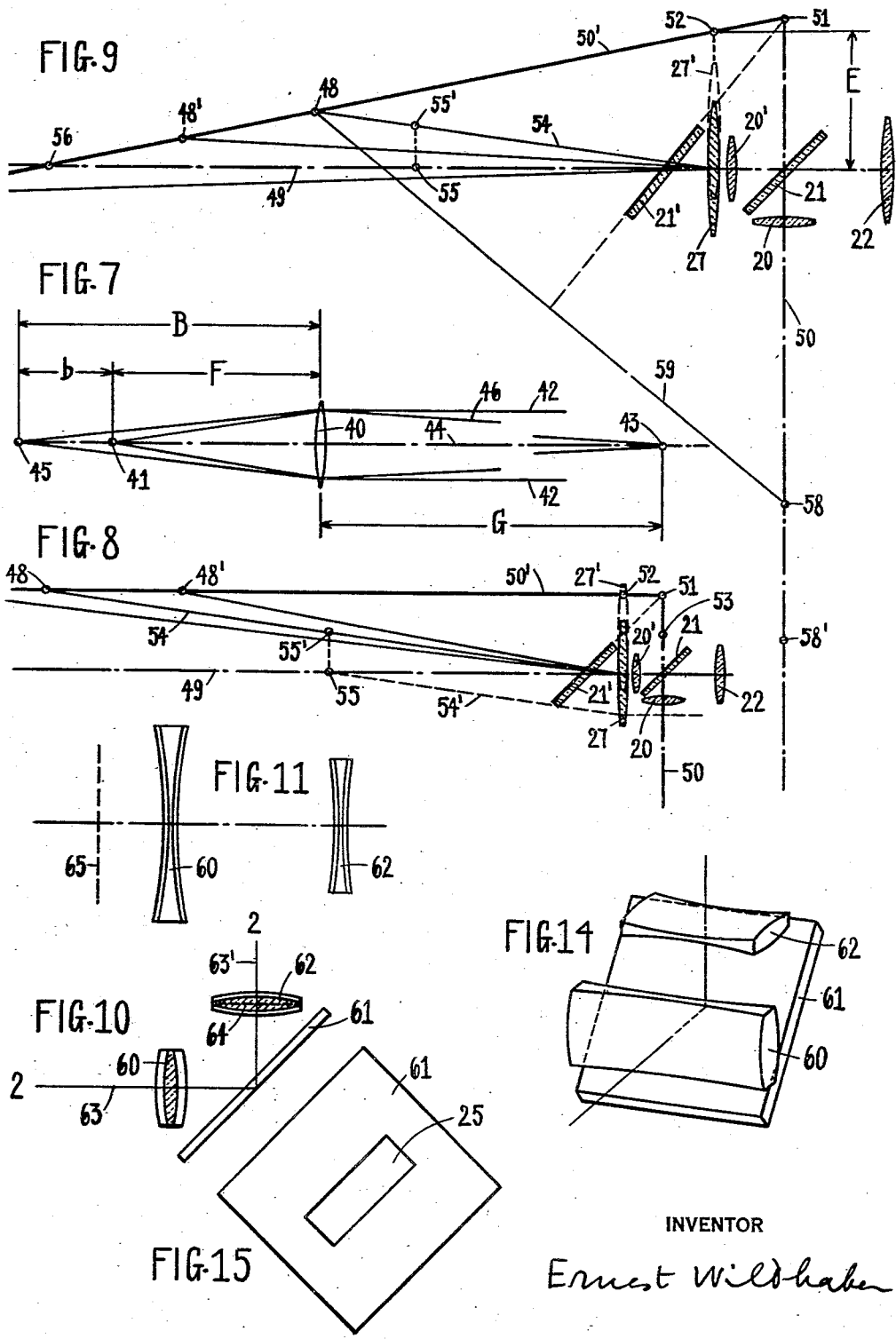

May 23, 1933.  E. WILDHABER  1,910,731
PHOTOGRAPHIC CAMERA
Filed Nov. 19, 1928   3 Sheets-Sheet 3
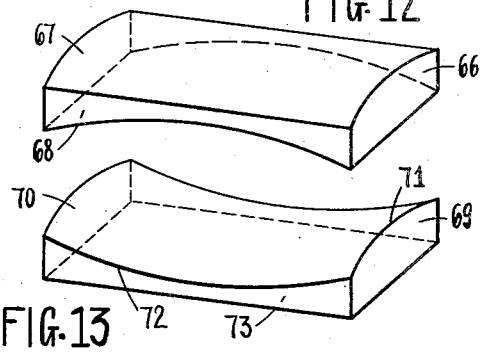
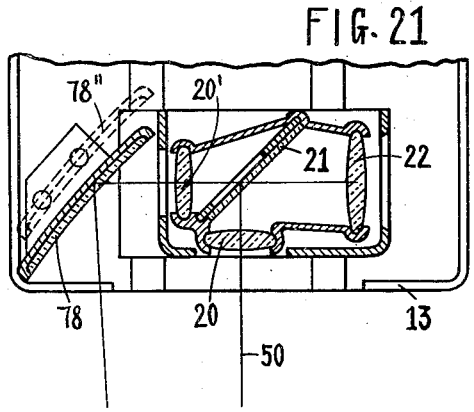
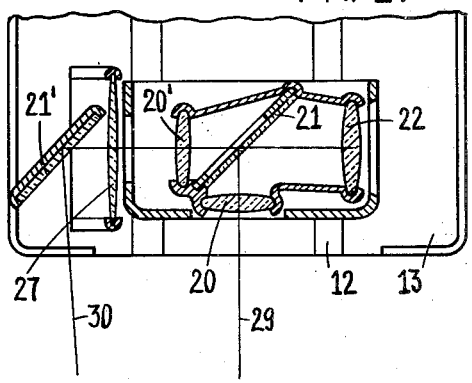
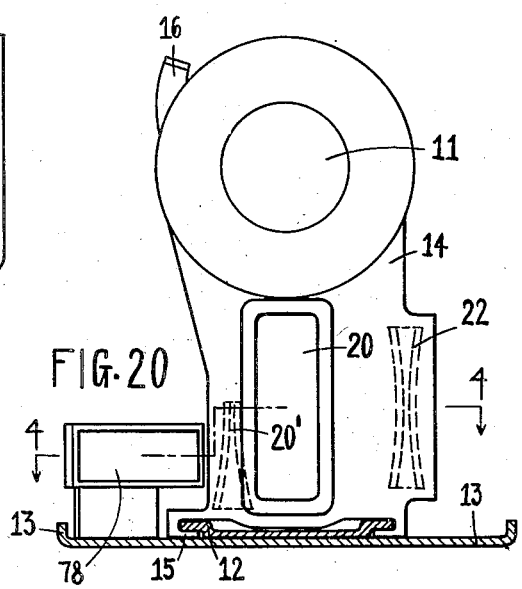
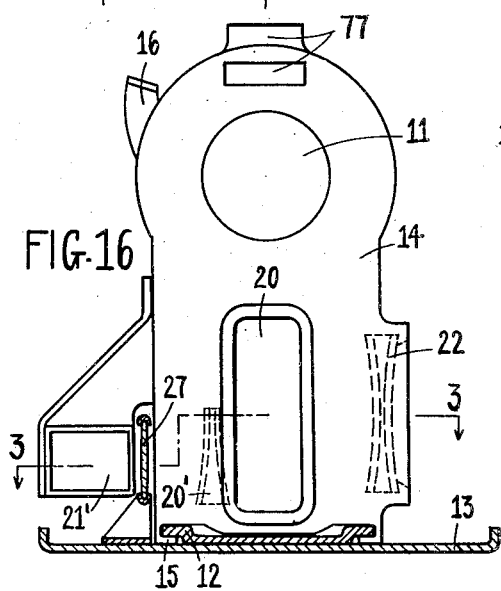
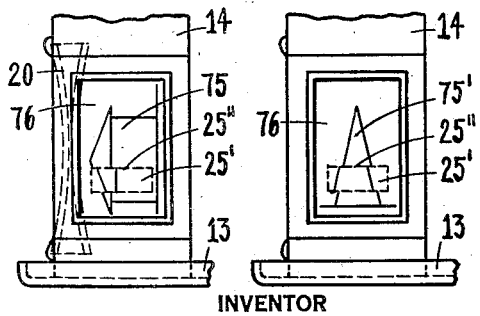
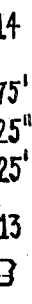
INVENTOR
Ernest Wildhaber Patented May 23, 1933

1,910,731

UNITED STATES PATENT OFFICE

ERNEST WILDHABER, OF BROOKLYN, NEW YORK

PHOTOGRAPHIC CAMERA

Application filed November 19, 1928. Serial No. 320,402.

The present invention refers to photographic cameras, and particularly to means provided on photographic folding cameras for focussing a camera and for determining the range of the objects included on a photographic picture.

One object of the present invention is to shorten the operations preparatory to taking a picture and to provide novel means for obtaining accurate pictures in an expedient and practical manner. Another object is to provide a photographic camera with simple and rigid means for focussing it correctly and accurately while loaded and for simultaneously checking up the objects included on a picture to be taken. A further aim is to provide simple means for setting the camera to proper focus, while loaded, without necessitating any guess work as to the distance of the objects to be pictured.

A further aim of the present invention is to provide an accurate focussing operation on a folding camera with means of simple and rigid construction, which are partly maintained in unison with the photographic objective of the camera and partly with another portion of the camera, in a manner to avoid any motion other than the motion already required for setting the camera to proper focus. Further an expedient focussing operation shall be provided with means partly connected with the photographic objective of a camera and partly connected with the cover of the camera, and without the use of parts moving transversely to the focussing path of the photographic objective.

A still further object of the present invention is to provide a sight finder suited to furnish noninverted images, and to combine said sight finder with simple means for directly focussing a camera without resorting to guess work.

Other objects will appear in the course of the specification and from recital of the appended claims.

My invention is exemplified in the accompanying drawings, in which

Fig. 1 is a simplified front view of a photographic folding camera constructed according to the present invention.

Fig. 2 is a partial section along line 1—1 of Fig. 1.

Fig. 3 is a partial side view corresponding to Fig. 1.

Fig. 4 is a diagram explanatory of the basic principle of the embodiment indicated in Fig. 1, Fig. 2 and Fig. 3 and of other embodiments.

Fig. 5 is a diagram explanatory of a slightly modified principle, as used for instance in the embodiment illustrated in Fig. 16 to Fig. 19.

Fig. 6 is a diagram illustrative of a further modification of the present invention.

Fig. 7 is a diagram illustrative of various focussing positions of a photographic objective, indicated by a single lens.

Fig. 8 is a diagram illustrative of mathematical relations in a focussing arrangement made in accordance with the present invention.

Fig. 9 is a diagram similar to Fig. 5, having auxiliary lines added for demonstrating the mathematical aspect of a preferred embodiment of the present invention.

Fig. 10 is a side view of the chief elements of a sight finder suited to furnish noninverted images such as is preferably used in combination with novel focussing means.

Fig. 11 is a developed plan view observed at right angles to the mean path of light 2—2 of Fig. 10.

Fig. 12 is a perspective view of a simplified lens such as might be used in the sight finder referred to in Fig. 10 and Fig. 11.

Fig. 13 is a perspective view of another lens of the same character as the lens indicated in Fig. 12.

Fig. 14 is a perspective view of the chief elements of a sight finder suited to furnish noninverted images.

Fig. 15 is a plan view of a mirror surface, illustrative of a transparent slot preferably provided in accordance with the present invention.

Fig. 16 is a simplified front elevational view of another, preferred embodiment of the present invention.

Fig. 17 is a partial section along lines 3—3 of Fig. 16.

Fig. 18 and Fig. 19 are partial side views corresponding to Fig. 16.

Fig. 20 is a simplified front elevational view of a further embodiment of the present invention.

Fig. 21 is a partial section along lines 4—4 of Fig. 20.

Fig. 22 is a diagram illustrative of the principles underlying the embodiment indicated in Fig. 20 and Fig. 21.

In the Figures 1 to 3 numeral 11 denotes a photographic objective movable along guides 12 of a cover 13. Cover 13 is hinged to the body of a photographic camera in any suitable known manner. Objective 11 is carried by a support 14, which contains projections 15 engaging guides 12. Motion of support 14 and objective 11 along guides 12 may be effected either through direct hand pressure, or preferably with known screws or levers, which are however omitted in the drawings as not forming part of the present invention.

A known shutter mechanism may be released by pressing lever 16. Numeral 17 denotes a small sight finder built into the objective casing and useful in taking vertical pictures, that is to say useful for taking pictures having vertical lines recorded in a direction parallel to their longer side.

A larger sight finder 18 is disposed intermediate objective 11 and projections 15, and secured to support 14, which maintains it in constant relation to objective 11. Sight finder 18 consists of a spherical lens 20 facing the objects, of a plane mirror 21, see Fig. 2, disposed perpendicular to cover 13, and of a spherical lens 22, through which the pictured objects are visible. Lens 20 is proportioned to effect a real image of the objects on or adjacent lens 22.

The lenses and mirror 21 are securely held in place with suitable known means. Sheet 23, which protects mirror 21 and contributes to hold it in place, contains a slit 24 in its center. Mirror 21, which here consists of a small glass plate covered on side 21″ with known reflective substance, contains a transparent area corresponding to slit 24. The said transparent area may be obtained by omitting said area in applying the reflective layer to the mirror or by removing said layer on said area. Mirror 21 has a general aspect as indicated in Fig. 15, and contains a transparent area 25 of the form of a slot surrounded by or disposed intermediate of reflective portions of the mirror.

If a metal mirror is substituted to a glass mirror 21, it is simply provided with a hole or slot occupying an area 25 (Fig. 15).

The transparent portion (25) of mirror 21 is seen through lens 22 (Fig. 1 to Fig. 3), and is indicated in dotted lines 25′ in Fig. 3.

Lens 22 effects a virtual enlargement of the length of actual area 25.

According to the present invention means are provided for presenting a portion of the objects through area 25. The portions seen through area 25 belong to a view taken from a different view point, than the objects seen in mirror 21, and moreover the position of the images seen through area 25 is made to depend on the focussing position of the camera, as will now be further described.

A spherical lens 20′ is disposed adjacent mirror 21 on the opposite side of its reflective surface. Further a plane mirror 21′ is provided in front of lens 20′, and presents a partial view of the objects to be pictured to lens 20′. Lens 20′ as well as mirror 21′ are secured to objective 11, and particularly to its support 14. Lens 20′ forms part of a unit comprising lenses 20, 22 and mirror 21, which may be first assembled and then secured to support 14 of objective 11; and mirror 21′ is secured to support 14 in any suitable known manner.

Intermediate mirror 21′ and lens 20′ another lens 27 is disposed parallel to lens 20′. Lens 27 is convex and spherical and is rigidly secured to cover 13 of the camera. The height of lens 27 as well as of mirror 21′, in a direction perpendicular to cover 13, is preferably made smaller than the height of mirror 21, inasmuch as lens 27 and mirror 21′ serve to produce only a portion of the whole image, namely the portion made visible through area 25. Inasmuch as objective 11 and the parts connected with it are movable lengthwise of cover 13, for focussing the camera in known manner, lens 27 assumes different positions relatively to lens 20′ and mirror 21′, and for this reason is made comparatively long, namely long enough to completely cover the length of area 25 in all focussing positions of the camera.

The principle underlying this structure will now be explained with reference to the diagram Fig. 4. Mirror 21, together with the lenses cooperating with it, presents a reduced size view of the objects, as taken from one view point; and mirror 21′, together with the lenses cooperating with it, presents a partial reduced size view of the objects, as taken from another offset view point.

We will first consider a mean focussing position of the camera. In Fig. 4 lines 29, 30 indicate rays of light coming from an object point located on the optical axis (29) of the camera at the distance, which corresponds to said mean focussing position. Rays 29, 30 are the central rays of bundles of light passing to the mirrors 21 and 21′ respectively. In the shown mean focussing position of the camera, both bundles of light form a coinciding image at 31 of the considered object point. Similarly other object points or lines disposed at the same distance from the camera have each a coinciding image formed by the bundles of light, which pass to the two mirrors 21, 21' respectively. In other words points or lines of objects disposed at a distance corresponding to the mean focussing position of the camera have images formed in such manner, that in the said means focussing position of the camera an image formed by mirror 21', and lenses 27, 20' coincides with the corresponding image formed by lens 20 and mirror 21.

In viewing the image of the objects through lens 22, see Fig. 3, corresponding image points formed by the said two bundles of light are not simultaneously observed with one eye. What may be actually observed is an image formed partly by the bundle of light reflected by mirror 21 and formed partly by the bundle reflected by mirror 21'. The points appearing inside of area 25', see Fig. 3, are formed by the bundle of light reflected by mirror 21', and the image points appearing outside of area 25' are formed by the light reflected at mirror 21. In the case above assumed, where the camera is in its mean focussing position and objects are considered which are disposed at a distance corresponding to said focussing position, the image appearing inside of area 25' is seen in alinement with the image formed outside of area 25'. Broadly disposition is made such that the image formed inside of area 25' is in alinement with the image formed outside of area 25', when the camera is properly focussed, that is to say when the camera is in a position corresponding to the distance of the objects. This will be further described hereafter.

For the sake of explanation, we will consider now an object point disposed on line 29 at a considerably smaller distance than corresponds to the mean focussing position (Fig. 4) of the camera. Line 29 still remains the central ray of the bundle of light passing from said object point to lens 20 and mirror 21, and an image (31) of the said object point is formed on lens 22 by the light reflected at mirror 21. The bundle of light, which passes from said object point to mirror 21' is indicated by a central ray 33 shown in dotted lines. Ray 33 is reflected at mirror 21' towards lens 27, and for convenience has been so selected, that it intersects the reflected ray 30 at lens 27. The light reflected at mirror 21' effects an image 35 of the considered object point. Point 35 is located at lens 22 and is seen to be offset from point 31, which is the image of the same object point, as formed by the light reflected at mirror 21.

Broadly any point of objects disposed at another distance than corresponds to a considered focussing distance of the camera have two separate images formed by the two bundles of light reflected at the mirrors 21 and 21' respectively. And any continuous line of said objects contains two different line images formed by said two bundles of light respectively. Inasmuch as the two images of any object point are not simultaneously seen with one eye, but only one at a time, an eye of an observer sees a portion of one line image on area 25', and it sees the other image outside of area 25'. Any continuous line of the objects appears as a cut up line 32, 32', see Fig. 3, provided that said line extends across area 25'.

To obtain the proper focussing position of the camera, the objective 11 is moved relatively to cover 13, until the lines of the objects have alined images, that is to say until the portions 32, 32' are in alinement and appear as a single line. Lens 27, which is secured to cover 13, then assumes a different position relatively to the other optical elements. Such a different relative position of lens 27 is indicated in dotted lines 27'. In this position ray 33 is refracted at lens 27' in a manner that it continues like ray 30, and that the image of the considered object point coincides with image 31. The two bundles of light then form coinciding images. The mathematical interrelation to be observed for effecting coinciding images when the camera is correctly focussed will be discussed hereafter.

The chief object of lens 27 is to deflect the images so that they appear in alined position. It is readily understood that lens 27 however also affects the size of the image formed by one of the bundles of light, and the distance of said image from lens 27, although the curvature of lens 27 has been much exaggerated in the drawing. To compensate this action of lens 27, lens 20' is made of smaller or flatter curvature than lens 20, that is to say it contains a slightly larger radius of curvature than lens 20. Also, if so desired, lens 20' may be disposed slightly closer to mirror 21 than lens 20. In general the disposition and the proportions of lens 20' are such, that its joint action with lens 27 is equivalent or practically equivalent with the action of lens 20.

In the diagram Fig. 4, the two mirrors 21, 21' are shown disposed at equal angles, namely at angles of forty-five degrees (45°), and the line connecting the centers of lenses 22 and 20' is disposed at a slight angle to the reflected central line 29. This disposition permits to provide a central position of lens 27 while the camera is focussed at a finite mean distance, and to obtain a very accurate focussing operation.

The same aim may however also be effected in various other ways, among which diagram Fig. 5 illustrates a disposition which is usually preferred. According to this disposition, the line connecting the centers of lenses 22 and 20' coincides with the reflected central line 29, and the two mirrors 21, 21' include a slight angle with each other, as can be clearly seen on the auxiliary elongations 37, 37' of the mirror surfaces. The angular disposition of the mirrors here effects a mean focussing position of the camera, while lens 27 is in central position, that is to say while lens 27 has no deflecting position, and lets the mean ray 30 pass without refraction.

The principle of operation of this arrangement is the same as has already been described with reference to Fig. 4. Lines 29, 30 again denote central rays coming from an object point situated at the distance which corresponds to the mean focussing position of the camera. In this position of the camera the two bundles of light form coinciding images at 31 of said object point. Dotted lines 33 denote a central ray of a bundle of light coming from an object point situated on line 29 at an infinite distance from the camera. The rays of said bundle effect an image of said object point at point 31, which coincides with the image point as formed by the light reflected at mirror 21, as soon as the camera has been brought into the focussing position corresponding to infinite distances of the objects. In this focussing position of the camera lens 27 has assumed dotted position 27' relatively to the other optical elements jointly advanced on the cover (13) of the camera, and refracts central ray 33 in a manner that it coincides with ray 30 after passing through lens 27'.

Another structure is diagrammatically indicated in Fig. 6, in which mirror 21 is disposed outside of lens 20 and where lens 20' is thereby eliminated. The convex curvature of lens 27 is here compensated by providing a mirror 21' which is slightly curved and contains a convex curvature.

Diagram Fig. 7 serves to illustrate the nature of the focussing adjustments of a photographic camera. As well known, said adjustments are substantially the same when the photographic objective comprises a plurality of lenses and when it consists of a single lens only. In the drawings a single lens 40 is indicated to represent a photographic objective, which has a focus for parallel rays of light at point 41. In other words parallel rays 42 are so refracted by objective 40, that they converge to a point 41. Objects situated at an infinite distance or at a large distance from objective 40 have images formed in a plane which passes through point 41, as is well known. The distance of this plane, and of point 41 from the central plane of objective 40 is called the focal distance and is denoted with F. Another object point (43) situated on the optical axis 44 of the objective at a distance G from said objective has an image formed at point 45. Objects situated at said distance G in front of objective 40 have images formed in a plane, which passes through point 45. The image plane as well as point 45 have a distance B from the central plane of objective 40. This distance is seen to be larger than distance F. The distance between the objective (40) and the plane of the image therefore should be made the larger, the nearer the objects are to the objective 40, as is well known.

When rays 42, 46 are considered, which pass through the same points of objective 40, the incident portion and the refracted portion of a ray include the same angles with each other, regardless of whether a ray 42 is considered, or a ray 46 which comes from an object point disposed at a finite distance from the objective.

From this known relation, the following known mathematical formula may be derived:

$$\frac{1}{G}+\frac{1}{B}=\frac{1}{F} \quad (1)$$

With $B=F+b$, the above formula can be transformed into the formula:

$$b=\frac{F^2}{G-F} \quad (1a)$$

We will now consider the focussing arrangement indicated in Fig. 8. In this arrangement the mirrors 21 and 21' are disposed parallel, and lens 20' is disposed in a manner that its center lies on line 49 which coincides with the central ray of the bundle of light reflected by mirror 21.

Mirror 21' forms virtual images 48, 48' of object points situated on optical axis 50. Points 48, 48' are situated on a line 50', which is the image of line 50, and which may be determined in known manner by drawing perpendiculars to the mirror surface through the object points and by locating the points 48, 48' on the same perpendiculars as the corresponding object points and at the same distance from the mirror surface, on the opposite side of said surface. In the instance illustrated in diagram Fig. 8, line 50' is parallel to line 49, and the distance of any point 48, 48' from point 51 equals the distance of the corresponding object point from point 51. Similarly the distance of points 48, 48' from point 52 and from lens 27 equals the distance of the corresponding object points from point 53, inasmuch as point 52 and point 53 have the same distance from point 51. The distance of a point 48 or 48' from point 52 or from lens 27 will be denoted with G' in the following, and is substantially equal to distance G.

In the position of lens 27 shown in full lines the images of very far objects appear in alinement. Objects disposed at a distance corresponding to point 48 appear in alinement, when lens 27 is displaced relatively to the other optical elements to a relative position shown in dotted lines 27'. In this position ray 54, which seemingly comes from virtual point 48, is refracted by lens 27' in a manner to continue along line 49.

Numeral 54' denotes a ray, which has the same position relatively to the initial position of lens 27, as ray 54 has to the dotted position 27'. Ray 54' intersects axis 49 in a focal point 55, which assumes a dotted position 55' when the lens 27 has moved into dotted position 27'. Point 55 is seen to be also the point of convergence of imaginary rays parallel to line 49 and refracted at lens 27 and may be briefly called the focus of lens 27. Its distance from lens 27 is denoted with F' in the following.

According to the foregoing, the images formed with light reflected respectively at the two mirrors 21, 21' should appear in alinement, when the camera is properly focussed, that is to say when the photographic objective has such a distance from the photographic layer of a film or plate as the plane on which the images of said objects are formed. In other words alinement should be effected, when the photographic objective has been advanced by a distance $b$ on the cover (13) of the camera, as compared with the position when the camera is focussed at infinity. Accordingly the displacement of lens 27 and distance 55—55' should be equal to $b$, when considering an object point corresponding to point 48 and other object points situated in the same plane parallel to the photographic objective. This relationship can be mathematically expressed, as will be outlined in the following for the convenience of those interested in performing my invention with a minimum effort.

The angle formed between ray 54 and axis 49 is always small and can therefore be expressed by its trigonometrical tangent as $$\frac{E}{G'}$$

when E denotes the distance between parallel lines 49 and 50'. The same angle can also be expressed as $$\frac{\text{distance } 55\text{—}55'}{F'}$$

which according to the foregoing should also be equal to $$\frac{b}{F'}.$$

Accordingly we have the equation:

$$\frac{b}{F'} = \frac{E}{G'};$$

and $$b = \frac{E \times F'}{G'}. \quad (2)$$

For comparison, previously derived equation (1a) is reproduced below:

$$b = \frac{F^2}{G-F}. \quad (1a)$$

In equation (1a), distance F is always much smaller than distance G, and (G—F) is approximately equal to G'. The close resemblance of the two equations is at once apparent, which exists when the proportions are selected in a manner that:

$$E \times F' = F^2$$

With these proportions adapted, the images seen through lens 22 appear always in alinement, when the camera is about correctly focussed.

The theoretical accuracy of the focussing operation can be further increased as compared with the arrangement Fig. 8 and brought to a very high degree, by a disposition in which lens 27 is in a central position when the camera is in the mean focussing position, which corresponds to a finite distance of the objects. This arrangement has already been indicated in all figures except Fig. 8, and will now be further analyzed with reference to diagram Fig. 9.

In diagram Fig. 9, mirror 21' is disposed at a slight angle to mirror 21 and forms an image 50' of optical axis 50. Line 50' is inclined to axis 49 and intersects said axis in a point 56. Point 56 in reality is disposed at a much larger distance than could be indicated in the drawings, and preferably corresponds to an object point disposed at such a distance from the camera, as corresponds to its mean or its average focussing position. In other words if the total focussing range of the camera is denoted with $b_0$, so that the photographic objective may be displaced a total distance $b_0$ from its position when focussed at infinity to its position focussed at the closest objects within its range, point 56 may correspond to a focussing displacement of ½ $b_0$ as compared with the position focussed at infinity. According to formula (1a) the corresponding distance $G_0$ of the objects from the photographic objective may be computed as:

$$G_0 = F + 2\frac{F^2}{b_0}.$$

Corresponding points 48, 48' and object points 58, 58' again lie on the same perpendiculars (59) to the plane of mirror 21' and at equal distances on either side of said plane, as is well known. The distance of any point 48, 48', from point 52 is denoted with G' and is substantially equal to distance G. It can be readily demonstrated that the angle included by a ray 54 with axis 49 can be mathematically expressed with high accuracy as follows, in arc measure or tangent measure:

$$\frac{E}{G'} - \frac{E}{G_o'},$$

when $G_o'$ denotes the distance of point 56 from point 52.

The displacement of lens 27 as compared with its central position equals distance 55—55', which can be mathematically expressed as follows:

$$\text{Distance } 55-55' = F' \cdot E \left( \frac{1}{G'} - \frac{1}{G_o'} \right). \quad (3)$$

Through differentiation in known manner the following further equation may be obtained from the above one:

Increment of distance 55—55' =

$$-\frac{F' \cdot E}{G'^2} \cdot dG', \quad (3a)$$

where $dG'$ denotes the increment of distance $G'$.

The displacement of lens 27 and distance 55—55' should according to the above also be equal to the focussing adjustment, namely to $(b - \tfrac{1}{2} b_o)$, which according to Formula (1a) can be written:

$$(b - \tfrac{1}{2} b_o) = \frac{F^2}{G-F} - \tfrac{1}{2} b_o. \quad (4)$$

Through differentiation the following further formula may be obtained in known manner:

$$\text{Increment of } (b - \tfrac{1}{2} b_o) = -\frac{F^2}{(G-F)^2} \cdot dG. \quad (4a)$$

In these formulas distances G and G' are almost identical and only differ by a constant, $G' = G + $ constant, and accordingly the increments $dG'$ and $dG$ are identical.

Proportions are so selected that the increment of distance 55—55' equals the increment of $(b - \tfrac{1}{2} b_o)$ in the mean focussing position of the camera. In mathematical symbols, this sentence reads:

$$\frac{F' \cdot E}{G_o'^2} = \frac{F^2}{(G_o-F)^2};$$

or $$F' \cdot E = F^2 \cdot \frac{G_o'^2}{(G_o-F)^2}. \quad (5)$$

This equation is exactly fulfilled at distances G and G' corresponding to the mean focussing position of the camera, and it is approximately fulfilled at all other focussing positions.

A very accurate adjustment may then be obtained, which by far exceeds in accuracy the adjustments obtained on conventional cameras even by good guessers of distance.

A preferred embodiment of the present invention consists in the combination of the described principles with a sight finder which is capable of effecting non inverted images of objects. Sight finders of this character have been disclosed in my pending application entitled: Sight finder, filed September 29, 1928, Serial No. 309,296. Its principles are here briefly described with reference to Figures 10 to 14.

A sight finder of this character may consist of a lens 60 (see Fig. 10) facing the objects to be pictured, of a plane mirror 61, and of a lens 62, through which the images are viewed. The lenses 60, 62 contain convex profiles in the section Fig. 10, like the lenses of conventional sight finders. In contradistinction thereto, lenses 60, 62 differ from the spherical lenses of conventional sight finders, and have different profiles in planes 63, 63', which are perpendicular to the drawing plane Fig. 10. In the present instance both lenses 60 and 62 are concavely curved in said planes. Fig. 11 affords a view of lenses 60, 62 taken at right angles to planes 63, 63'. Mirror 61 is omitted in Fig. 11. The lenses 60, 62 refract light in such manner, in the projection Fig. 11, as if they were concave spherical lenses of the curvature indicated in Fig. 11, as has been demonstrated in the application referred to. In the projection Fig. 10, lenses 60, 62 refract light rays in such manner as if they were convex spherical lenses of the curvature shown in Fig. 10. Accordingly, the rays of light appear in conventional disposition in the projection Fig. 10, and appear to form a real image of the objects at 64, on or adjacent lens 62.

In the projection Fig. 11 a virtual image of the objects is formed at 65 through the lenses 60, 62. The two images, 64 and 65, of the two projections Fig. 10 and Fig. 11 appear to an observer as a single image, which reproduces the objects on the side on which they appear to direct vision. In other words an object disposed at the right appears also at the right side in the image, whereas the conventional sight finders produce inverted images, in which an object disposed at the right appears at the left side, as is well known.

Two forms of lenses are illustrated in perspective in Fig. 12 and Fig. 13. Lens 66, Fig. 12, contains a convex cylindrical surface 67 on one side, and a concave cylindrical surface 68 on the other side. Lens 69, Fig. 13, combines the two surfaces 67, 68 of lens 66 to a single curved surface 70, which contains a convex profile 71 in one direction and a concave profile 72 in another direction. In the instance illustrated in Fig. 13, the surface 73 opposite curved surface 70 is a plane. The lenses 60, 62 indicated in Fig. 10, Fig. 11 and also in Fig. 14 contain surfaces of the character of surface 70 of lens 69, and differ from the latter lens merely by containing two curved surfaces 70 instead of one surface 70 and a plane side 73. Other lenses may also be used, as more fully described in the above said application.

Fig. 14 affords a perspective view of the chief elements of a unit for obtaining non inverted images.

Elements and units of this character may be readily combined with the principles disclosed, and furnish embodiments with marked advantages. All the computations described and all the diagrams given (such as Fig. 4 to Fig. 9) are also applicable without change to such embodiments, of which one will now be described with reference to Fig. 16 to Fig. 19. Lens 20 is disposed to face the objects to be pictured and is here of oblong form. It contains a convex profile in the sectional view Fig. 17, and concave profiles in planes parallel to the drawing planes of Fig. 18 and Fig. 19. Lenses 22 and 20' are of the same character, namely of the character of lenses 62, 60 of the Figures 10, 11 and 14. Objective 11 is mounted on a support 14, which contains projections 15 movable along guides 12 of a cover 13. The latter is hinged or secured to a photographic folding camera in known manner.

Mirror 21', lens 20' and intermediate lens 27 may be disposed nearer to cover 13 than the center of lenses 20 and 22, as indicated in the drawings. Lens 20' has then a tapered aspect in view Fig. 16, and embodies a portion of a lens whose center is disposed at the same level as the centers of lenses 20, 22. The relations described with reference to Fig. 2 also hold true for Fig. 17. Lens 27 may be made cylindrical or spherical, and in either case contains a convex profile in a plane parellel to cover 13.

Fig. 18 relates to a horizontal position of the camera, so that the pictures taken have their longer sides corresponding to horizontal lines. Fig. 19 on the other hand relates to taking vertical pictures. A house 75, diagrammatically indicated as an image in Fig. 18, is shown out of alinement, the portion appearing on area 25' being displaced in a direction which reveals the necessity of moving the photographic objective towards the photographic surface. The objective is therefore moved towards the body of the camera, until the house appears in alinement. The camera is then correctly focussed. Area 76 is made of such size that all the objects appearing inside of it also appear on the photographic picture to be taken.

The cone appearing in Fig. 19 is also shown out of alinement, and the portion inside of area 25' appears displaced in a direction which indicates the necessity of advancing the photographic objective relatively to cover 13, and of thereby increasing the distance between the photographic surface and the objective.

It is noted that the two images formed inside and outside of area 25' have adjacent sides 25'' extending substantially parallel to the optical axis (29, Fig. 17) of the camera.

Cone 75' appears in its natural upright position, whereas usual sight finders would reproduce the objects upside down, when used in the position corresponding to Fig. 19. The house indicated in Fig. 18 also appears in natural position as a non inverted image, so that all the parts appear in the image on the same side, at which they appear to direct vision on the actual object.

Even when used as a sight finder alone, the disposition according to the present invention contains the advantage of permitting comparatively large images by utilizing space hitherto not made practical use of. Moreover by providing non inverted images it allows the use of the same built in sight finder in a vertical position of the camera as well as in a horizontal position, that is to say in positions corresponding to Fig. 19 and to Fig. 18 respectively. At the same time the disposition illustrated in Fig. 16 to Fig. 21 prevents confusion by presenting the objects in the same positions in which they appear to direct vision.

A smaller sight finder 77 of the described character may be provided for downward vision in taking vertical pictures. Sight finder 77 is secured to objective 11 and continuously maintained in constant relation thereto.

It is noted that only a few parts are added to a sight finder to obtain also a focussing device, and especially that in the preferred embodiments illustrated the parts used perform no additional motions, that is to say no motion is provided other than already required for focussing a camera. The elements forming part of the focussing device are either in constant relation to support 14 of objective 11, or they are in constant relation to cover 13, along which objective 11 is moved for focussing.

These remarks also hold true for the further embodiment of the present invention, which is diagrammatically illustrated in Fig. 20, Fig. 21 and Fig. 22. In this embodiment the portions comprising lenses 20, 20', 22 and mirror 21 are the same as in the embodiment illustrated in Fig. 16 to Fig. 19, and constitute a sight finder, which is suited to effect non inverted images. A concave mirror 78 takes the place of mirror 21' and lens 27 of the already described embodiment. Mirror 78 is secured to cover 13 of the camera, whereas the other elements enumerated are built into support 14 of objective 11. Mirror 78 therefore assumes different positions relatively to the other elements, such as for instance relative position 78″ indicated in dotted lines. This relative position corresponds to a focussing position of the camera, in which the objective has been moved forward on cover 13 to picture comparatively close objects.

The principles of the embodiment illustrated in Fig. 20 and Fig. 21 are now explained with reference to diagram Fig. 22. Concave mirror 78 alone would form images 79, 80, 81 of object points situated at increasing distances on optical axis 50. In the mean relative position of mirror 78 indicated in full lines, the camera is focussed at objects corresponding to point 80, and lens 20′ together with mirror 78 effect images of said objects appearing on lens 22 in alined position. In the relative position of mirror 78, which is indicated in dotted lines 78′, point 79 has moved to a position 79′ on axis 49, and the objects corresponding to point 79 then appear in alined position on lens 22. The curvature of mirror 78 is so computed, that the relative displacement of mirror 78 from its position in full lines to the dotted position 78′ equals the adjustment of the photographic objective 11, which is necessary to effect a clear and concise image on the photographic surface.

In the preferred embodiments of the present invention, the two images formed of the objects are made visible in a viewing direction along the relative displacement of the two mirrors 21, 21′.

The present invention is also applicable to photographic cameras for taking moving pictures. Amateur movie cameras of this character, which contain focal adjustment, ordinarily would require simultaneous performance of several operations:

The moving objects should be continuously watched and it should be made sure that they are inside of the field of vision. At the same time the changing distance of the objects from the camera should be continuously estimated, and the objective should be simultaneously set to a position corresponding to said estimated distance. In this compound operation the view of the operator is alternately shifted from the sight finder to the scale for setting the objective and back to the sight finder.

The present invention makes it possible to watch the moving objects in the sight finder, and to adjust the objective in correspondence with the changing distance of the objects, while keeping the view continuously on the sige finder. Moreover no estimation of the changing distances is necessary.

Various further embodiments may be devised by simply applying current practice and customary knowledge of the art, and without departing from the spirit of my invention. For definition of its scope I rely upon the annexed claims.

What I claim is:

1. In a photographic folding camera, a cover hinged to the body of the camera, a photographic objective movable lengthwise of said cover for focussing the camera, a sight finder held in constant relation with said photographic objective and suited to effect non inverted images, said sight finder comprising a lens facing the objects, a mirror, and another lens disposed in the path of light reflected at said mirror and containing a concave profile in a plane perpendicular to said cover, additional means for effecting an image visible through said other lens, said additional means comprising a mirror and a lens connected with said objective and a further lens connected with said cover and disposed intermediate of the last named mirror and lens.

2. In a photographic folding camera, a cover hinged to the body of the camera, a photographic objective movable relatively to said cover for focussing the camera, and a sight finder disposed intermediate said objective and said cover in the focussed position of the camera, said sight finder comprising a reflective surface disposed perpendicular to the surface of said cover and two lenses for effecting a non inverted image of the objects to be pictured.

3. In a photographic folding camera, a cover hinged to the body of the camera, a photographic objective movable along guides of said cover for focussing the camera, and a sight finder movable with said objective and disposed intermediate said objective and the portions engaging said guides, said sight finder comprising reflective means and refractive means for effecting a non inverted image of the objects to be pictured, said image being suited to be viewed in a direction at an angle to the optical axis of the camera.

4. In a photographic folding camera, a cover hinged to the body of the camera, a photographic objective movable along guides of said cover for focussing the camera, a sight finder secured to said objective and disposed intermediate said objective and the portions engaging said guides, said sight finder being suited to furnish non inverted images visible in a direction parallel to said cover, and another smaller sight finder secured to said objective and disposed on the side opposite to said cover, said other sight finder being positioned to furnish images visible in a direction perpendicular to said cover.

5. In a photographic camera, an objective, film holding means, means for changing the relation between said objective and said film holding means for focussing the camera, means for presenting a rectangular non inverted image of the objects in a viewing direction at an angle larger than forty-five degrees (45°) to the optical axis of the camera, the longer sides of said rectangular image being transversely disposed to said optical axis, means for presenting a non inverted image taken from a different view point for comparison with the first said image, and means for making the relative position of said images dependent on the focussing position of the camera.
6. In a photographic camera, an objective, film holding means, means for changing the relation between said objective and said film holding means for focussing the camera, reflective and refractive means for presenting a rectangular non inverted image of the objects in a viewing direction at an angle larger than forty-five degrees (45°) to the optical axis of the camera, the longer sides of said rectangular image being transversely disposed to said optical axis, means for presenting a non inverted image taken from a different view point for comparison with the first said image, and means for making the relative position of said images dependent on the focussing position of the camera.

ERNEST WILDHABER.